Patented Dec. 10, 1929

1,738,798

UNITED STATES PATENT OFFICE

GEORGE A. RICHTER AND EVERETT W. LOVERING, OF BERLIN, NEW HAMPSHIRE, ASSIGNORS TO BROWN COMPANY, OF BERLIN, NEW HAMPSHIRE, A CORPORATION OF MAINE

PRINTING-INK COMPOSITION AND PROCESS OF MAKING SAME

No Drawing.   Application filed August 30, 1927.   Serial No. 216,498.

This invention relates to printing ink compositions consisting of pigmented liquids, the liquid serving as a vehicle to carry and fix the pigment to the surface printed on.

Printing inks have heretofore been made by incorporating a pigment into an oleaginous vehicle, thus producing a suspension of the pigment in the vehicle. Thus, for news or other high speed presses, an ink composed of petroleum oil and carbon or lamp black, frequently with a small amount of toner pigment, has been generally employed. The oil is absorbed by the paper, leaving the pigment on the surface, so that if the oil spreads further than the boundary of the impressions, "halo" or "oil ring" may form around the impressions.

In accordance with our invention, spent liquor resulting from the digestion of wood, e. g., spent sulphite liquor, is employed together with a suitable oil and pigment for the production of printing inks. We have found it desirable to disperse the liquor in the oil, the oil thus constituting the continuous phase of the dispersion and the liquor the disperse phase. The pigment is suspended in the dispersion, our theory being that it tends to concentrate at the boundary or interface of the oil and liquor. Preferably, we also employ a material which stabilizes the dispersion and at the same time reduces its viscosity, soap or sulphonated oil being quite suitable for this purpose. Reduction in viscosity permits the use of the ink on fast presses, a viscous ink such as usually results when spent liquor is used being unsatisfactory for this purpose.

A printing ink such as described shows less tendency to produce "halo" or "oil ring" than the usual pigmented oil, as the spent liquor serves to dilute the oil. The spent liquor replaces oil that would otherwise be used, and being a waste material, thus serves to reduce the cost of the ink. It also increases the smoothness of the ink and enhances its covering power, so that less pigment need be used to obtain a given covering effect. When soap is added, it, too, increases covering power. It also permits more waste liquor to be employed in the ink, as it increases the stability of the dispersion. Inasmuch as the liquor exists in the disperse phase, it does not directly contact with the composition rolls, printing type, or paper, and hence can do no mischief such as it might if it existed in the continuous phase.

In preparing the ink compositions of the present invention, the oil is rapidly agitated and waste liquor gradually added thereto, pigment then being added while the agitation is continued. If desired, the oil may be pigmented before the addition of waste liquor, but it is more difficult to effect a dispersion of the waste liquor in the oil in this way. Or, if desired, the oil may be gradually poured into rapidly agitated waste liquor and the pigment then added, this latter method first yielding an oil-in-liquor dispersion which on further addition of oil and pigment or of oil-pigment mixture, with agitation, reverses to form a liquor-in-oil dispersion.

The waste liquor which we employ is derived from the chemical digestion of wood chips in the production of pulp, for instance that obtained from acid sulphite digestion. The waste sulphite liquor may be conditioned for use by boiling until its free $SO_2$ content has been driven off and it has been concentrated to the desired degree. Or it may be concentrated to a very high solids content and diluted to the desired concentration prior to use. If desired, it may be neutralized or made alkaline before or after concentration, or made acid prior to use, for, so far as we have been able to observe, a dispersion of the liquor may be effected whether it be alkaline, neutral, or acid. Preferably, however, the liquor is dispersed in neutral condition, as the resulting dispersions have the greatest stability, alkaline and acid liquors giving less stable dispersions, in the order given. When an acid waste liquor is dispersed, a larger amount of soap must be employed to bring the stability of the resulting dispersion up to that of neutral or alkaline liquor dispersion, as the concentration of soap effective in increasing stability and lowering viscosity is decreased owing to decomposition of soap by neutralization. Various types of waste liquors may be used in preparing our product.

For instance, waste sulphite liquor of sodium base, of ammonia base, of mixed calcium and magnesium base, or of mixed sodium, calcium, and magnesium base, have been successfully employed in producing our product. Waste sulphite liquors in which no base was employed, some containing sodium sulphate or ammonium sulphate, and even kraft or sulphate waste liquor, have also been successfully employed.

A specific example of procedure which has been found to yield a product having good characteristics for use as a black printing ink may be substantially as follows. About 100 parts of an oil derived from petroleum and having a specific gravity of 0.94 to 0.95 is rapidly agitated at room temperature, and about 89 parts of waste sodium base liquor having a solids content of 32.6% is gradually added while the mixture is being continuously agitated. About 12 parts of carbon black is then added while agitation is continued. This procedure results in a dispersion of the liquor-in-oil type, having a viscosity* of 344 absolute units.

Dispersions prepared as described are apt to vary in stability and to be quite high in viscosity and hence unsuitable for fast press work. The addition of a small amount of soap or saponifiable oil and alkali or certain materials such as sulphonated oil has been found to decrease viscosity to a surprising degree. Thus, when 0.24 parts of anhydrous soap or the same proportion of sulphonated castor oil is added to the ingredients, preferably the spent liquor, and a dispersion prepared as previously described, the viscosity is decreased to 90 in the case of soap, and to 174 in the case of the sulphonated oil. This marked reduction in viscosity is especially advantageous and makes possible the use of the product on fast presses.

While in the specific example given sodium base liquor of a certain concentration was employed, it should be understood that our invention is not limited to a particular waste liquor or liquor concentration. Thus, an alkaline earth base waste liquor would give approximately the same results as a similar sodium base waste liquor. Variation in waste liquor concentration merely affects initial viscosity, as does variation in the amount of oil and pigment, but the addition of the appropriate amount of soap or equivalent material will in each case bring down the viscosity to a marked degree and increase the stability of the dispersion, adapting the product for use as a printing ink on high speed presses. Material other than that mentioned may be used as pigment. For instance, carbon black may be mixed with a mineral black such as manganese dioxide or magnetic oxide of iron, or a mineral black alone

---

\* The viscosities were determined by a pipette standardized roughly against glycerine of known viscosity.

--- may be used. Other pigments may be used, depending upon the color desired. Materials other than those mentioned may be used to stabilize the product and reduce its viscosity, sulphonated oils other than castor oil, and sulphonated oil soaps having been found satisfactory for this purpose. While linseed or other vegetable oils may be used as the oleaginous vehicle in our compositions, nevertheless these materials do not have their viscosities lowered by the use of such materials as soaps, as do mineral oils such as petroleum oil. Soap in any event does, however, effect an increase in the stability of the product.

Having thus explained the nature of our invention and described a way of making and using the same, without attempting to set forth all of the forms in which it may be made or all the modes of its use, what we claim is:

1. A printing ink composition comprising a pigment and waste liquor resulting from the digestion of wood, said liquor being dispersed in oil.

2. A printing ink composition comprising a pigment, and neutral waste liquor resulting from the digestion of wood, said liquor being dispersed in oil.

3. A printing ink composition comprising a pigment and waste liquor resulting from the digestion of wood, said liquor being dispersed in oil and containing a material capable of stabilizing the dispersion and lowering its viscosity.

4. A printing ink composition comprising a pigment and waste sulphite liquor containing soap, said liquor being dispersed in oil.

5. A printing ink composition comprising a pigment and waste sulphite liquor containing soap, said liquor being dispersed in petroleum oil.

6. A printing ink composition comprising carbon pigment, a petroleum oil of a specific gravity of 0.94 to 0.95, and sodium base waste sulphite liquor of 32.6% solids content dispersed in such oil.

7. A printing ink composition, comprising carbon pigment, a hydro-carbon oil of a specific gravity of 0.94 to 0.95, and sodium base waste sulphite liquor of 32.6% solids content and containing a soap, said liquor and soap being dispersed in such oil.

8. A printing ink composition comprising 12 parts carbon black, 100 parts of hydro-carbon oil of a specific gravity of 0.94 to 0.95, and 89 parts sodium base waste sulphite liquor of 32.6% solids content dispersed in such oil.

9. A printing ink composition comprising 12 parts carbon black, 100 parts of hydro-carbon oil of a specific gravity of 0.94 to 0.95, and 89 parts of sodium base waste sulphite liquor of 32.6% solids content and containing 0.24 parts of soap, said liquor and soap being dispersed in such oil.

10. A process of making printing ink, which comprises dispersing waste liquor resulting from the digestion of wood in an oil and pigmenting the dispersion.

11. A process of making printing ink, which comprises dispersing waste liquor resulting from the digestion of wood in an oil, and then pigmenting the dispersion and adding a material capable of stabilizing the dispersion and lowering its viscosity.

12. A process of making printing ink, which comprises dispersing in an oil, waste liquor resulting from the digestion of wood and containing a material capable of stabilizing the dispersion and lowering its viscosity, and then pigmenting the dispersion.

13. A process of making printing ink, which comprises pigmenting an oil and dispersing waste liquor resulting from the digestion of wood and containing a material capable of stabilizing the dispersion and decreasing its viscosity in the pigmented oil.

In testimony whereof we have affixed our signatures.

GEORGE A. RICHTER.
EVERETT W. LOVERING.